3,579,478
POLYOLEFIN STABILIZATION
Howard E. Dunn and Ronald D. Mathis, Bartlesville, Okla., assignors to Phillips Petroleum Company
No Drawing. Filed Jan. 6, 1969, Ser. No. 789,384
Int. Cl. C08f 45/62
U.S. Cl. 260—45.75          7 Claims

ABSTRACT OF THE DISCLOSURE

Minor amounts of nickel complexes of the type $(R_2NCH_2CH_2S)_2Ni$ wherein R is hydrogen or a hydrocarbon radical, are incorporated into solid homopolymers or copolymers derived from olefins having from 2 to 6 carbon atoms per molecule for protection against the deteriorating effects of ultraviolet light.

---

This invention relates to polyolefin stabilization and has for an object the provision of a polyolefin composition stabilized against the effects of ultraviolet light.

Stabilizing polymer products against the degradation action of sunlight is very important. A number of agents have been found to be suitable as additives to certain polymer compositions to provide this protection. While certain complex nickel compounds such as nickel phenolates have been found to be useful for this purpose, the nickel complexes as a class are not generally suitable. For example, the incorporation of some complex nickel compounds into polymers has actually reduced the ultraviolet stability to a level which is well below that of the untreated polymer product. Also some nickel complexes are not stable at elevated temperatures and tend to lose their effectiveness if the polymer containing them is heated during processing.

Accordingly, a further object of this invention is the provision of an olefin polymer which is stabilized against the effects of ultraviolet light by use of a nickel complex which is also stable at elevated temperatures which may be attained during processing.

Further and additional objects will appear from the following description and the appended claims.

In accordance with this invention, it has been found that certain nickel compounds having the formula:

wherein R and R' are the same or different and each is from the group of hydrogen and a hydrocarbon radical containing from 1 to 20, inclusive, carbon atoms, are particularly suitable for stabilizing the solid homopolymers or copolymers of olefins having from 2 to 6, inclusive, carbon atoms per molecule against the deteriorating effects of ultraviolet light. R and R' are suitably hydrogen, alkyl, cycloalkyl, aryl, aralkyl and the like. Some examples of the nickel compounds embraced within the generic formula suitable for incorporation into the polyolefin for the purposes of this invention are:

bis(N,N-dimethyl-β-mercaptoethylamine)nickel
bis(N-decyl-β-mercaptoethylamine)nickel
bis(β-mercaptoethylamine)nickel
bis(N-isobutyl-β-mercaptoethylamine)nickel
bis(N,N-dioctyl-β-mercaptoethylamine)nickel
bis(N-benzyl-β-mercaptoethylamine)nickel
bis(N-ortho-tolyl-β-mercaptoethylamine)nickel
bis(N-eicosyl-β-mercaptoethylamine)nickel
bis(N-cyclopentyl-β-mercaptoethylamine)nickel
bis[N-(2,4,6-trimethylcyclohexyl)-β-mercaptoethylamine]nickel
bis(N,N-dihexadecyl-β-mercaptoethylamine)nickel
bis(N-phenyl-β-mercaptoethylamine)nickel
bis[N-(4-cyclobutylphenyl)-β-mercaptoethylamine]nickel
bis[N,N-di(2-ethylhexyl)-β-mercaptoethylamine]nickel and the like, and mixtures thereof. The type of nickel complexes contemplated for use in accordance with this invention are per se known to the art and may be prepared by the procedures set forth by Root and Busch in Inorganic Chemistry, vol. 7, No. 4, April 1968, at pages 789 to 795.

The polymers which are applicable for stabilization in accordance with the present invention are those olefin polymers prepared from olefins having from 2 to 6 carbon atoms per molecule. These may be homopolymers such as polyethylene or polypropylene or they may be copolymers of two or more such olefins. They also may include blends of polyolefins with other polymers such as the polystyrenes, polyvinyl chlorides, polyvinyl acetates, polyamides, etc. or mixtures thereof. The presently preferred polymer is polypropylene which may be prepared by any conventional method capable of polymerizing propylene to a solid polymer. Such methods are well known to those skilled in the art.

The quantity of the nickel complex which is incorporated into the polymer substrate can vary over a wide range depending upon the specific product fabricated from the polymer. Ordinarily from about 0.1 to about 5, and preferably from about 0.5 to about 2, parts by weight of the nickel complex are utilized per 100 parts of polymer. In addition to the ultraviolet stabilizing quantity of nickel complex, the polymer can also contain other conventional additives such as antioxidants, processing aids, pigments and the like.

The nickel complex may be incorporated into the polymer substrate using conventional techniques. Generally the ultraviolet stabilizers, together with any other additives, may be dry blended with a particulate powder and then the mixture is further mixed at temperatures somewhat above the melting point of the polymer.

The invention can further be illustrated by the following example:

EXAMPLE

Two nickel complexes, bis(N-decyl-β-mercaptoethylamine)nickel and bis(N,N-dimethyl - β - mercaptoethylamine)nickel were tested as ultraviolet stabilizers in a solid polypropylene having a melt flow of about 3. These nickel complexes were blended with a polypropylene fluff at an additive level of 0.5 part per hundred parts of polymer together with 0.1 part per hundred parts of a commercial thermal antioxidant whose function was principally to protect the polymer during the high temperature incorporation of the additives. The thermal antioxidant was Irganox 1093 from Geigy. After the ingredients were dry blended, they were masticated in a Brabender Plastograph at 200° C. for five minutes under a nitrogen atmosphere. The polymer composition was then cooled and formed into a 5 mil film by compression molding. Triplicate specimens, measuring 10 x 65 millimeters, were cut from each of the test films. The test specimens were then exposed to ultraviolet radiation by being inserted in a commercial blacklight-sunlight exposure device. In this device the specimens were subjected to ultraviolet light for twenty hours and then allowed to rest for four hours. Every 24 hours the specimens were tested for failure by flexing each test strip in a rolling motion such that most of the strip was subjected to about a 180° bend.

For purposes of comparison, test (control) strips were compared which were identical to those of the invention compositions except they did not contain the ultraviolet stabilizers. The results of these tests are shown in the following table.

TABLE I.—HOURS TO FAILURE

| Polypropylene control | Polypropylene containing bis (N-decyl-β-mercaptoethyl-amine)nickel | Polypropylene containing bis (N,N-dimethyl-β-mercaptoethyl-amine)nickel |
|---|---|---|
| 140 | 260 | 360 |
| 140 | 280 | 360 |
| 140 | 280 | 380 |
| [1] 140 | [2] 273 | [1] 367 |

[1] Average.

The data in the above table show very clearly that the additives of the present invention greatly extend the ultraviolet resistance of polypropylene.

While particular embodiments of this invention are described above, it will be apparent that many modifications may be made without departing from the spirit and scope of the appended claims.

What is claimed is:

1. A composition containing a polymer of a 1-mono-olefin having 2 to 6 carbon atoms and a stabilizing amount of a compound having the formula:

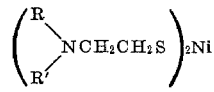

wherein R and R' are the same or different and each is from the group of hydrogen and a hydrocarbon radical containing from 1 to 20, inclusive, carbon atoms.

2. The composition of claim 1 in which the amount of said compound is between about 0.1 and 5 parts per 100 parts by weight of the olefin polymer.

3. The composition of claim 1 in which the polymer is polypropylene.

4. The composition of claim 1 in which the compound is bis(N-decyl-β-mercaptoethylamine)nickel.

5. The composition of claim 1 in which the compound is bis(N,N-dimethyl-β-mercaptoethylamine)nickel.

6. A composition containing a polymer of a mono-1-olefin having from 2 to 6 carbon atoms and between about 0.1 and 5 parts per 100 parts by weight of polymer of a nickel compound having the formula:

wherein R and R' are the same or different and each is from the group of hydrogen and a hydrocarbon radical containing from 1 to 20, inclusive, carbon atoms.

7. The composition of claim 6 wherein the polymer is polypropylene and the amount of nickel compound is between about 0.5 and 2 parts per 100 parts of polymer.

References Cited
UNITED STATES PATENTS 3,455,876   7/1969   Kusama et al. _____ 260—45.85

OTHER REFERENCES

"Irganox" Data Sheets of (1) "Irganox," (2) "Irganox 1010" and (3) "Irganox 1076," coded sheets numbered M–684, M–720 and M–707A, respectively, published by Geigy Chemical Corporation, received in Patent Office on May 29, 1964, July 14, 1965 and July 14, 1965, respectively.

DONALD E. CZAJA, Primary Examiner

V. P. HOKE, Assistant Examiner

U.S. Cl. X.R.
260—45.95, 439